(12) United States Patent
Yuan et al.

(10) Patent No.: US 12,164,879 B2
(45) Date of Patent: Dec. 10, 2024

(54) DATA PROCESSING METHOD, DEVICE, AND STORAGE MEDIUM

(71) Applicant: Tencent Technology (Shenzhen) Company Limited, Guangdong (CN)

(72) Inventors: Songling Yuan, Shenzhen (CN); Xinjie Wen, Shenzhen (CN); Xiaoli Wang, Shenzhen (CN); Haijiang Wu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 558 days.

(21) Appl. No.: 17/517,075

(22) Filed: Nov. 2, 2021

(65) Prior Publication Data
US 2022/0058349 A1  Feb. 24, 2022

Related U.S. Application Data

(63) Continuation of application No. PCT/CN2020/119523, filed on Sep. 30, 2020.

(30) Foreign Application Priority Data

Nov. 21, 2019 (CN) .......................... 201911149101.4

(51) Int. Cl.
  *G06F 40/58* (2020.01)
(52) U.S. Cl.
  CPC .................................. *G06F 40/58* (2020.01)
(58) Field of Classification Search
  CPC ...... G06F 40/58; G06F 40/216; G06F 40/284; G06F 40/30; G06F 40/44; G06N 3/006; G06N 7/01; G06N 3/045; G06N 3/08
  See application file for complete search history.

(56) References Cited

U.S. PATENT DOCUMENTS

| | | | |
|---|---|---|---|
| 6,338,033 B1 * | 1/2002 | Bourbonnais | G06F 40/58 704/7 |
| 2007/0061129 A1 * | 3/2007 | Barreiro | G06F 40/58 704/9 |

(Continued)

FOREIGN PATENT DOCUMENTS

| | | |
|---|---|---|
| CN | 102945232 A | 2/2013 |
| CN | 104572614 A | 4/2015 |

(Continued)

OTHER PUBLICATIONS

Fang et al. "Learning how to active learn: A deep reinforcement learning approach." arXiv preprint arXiv:1708.02383 (2017) (https://arxiv.org/pdf/1708.02383). (Year: 2017).*

(Continued)

*Primary Examiner* — Pierre Louis Desir
*Assistant Examiner* — Keisha Y. Castillo-Torres
(74) *Attorney, Agent, or Firm* — ArentFox Schiff LLP

(57) ABSTRACT

A data processing method is described. The method includes acquiring a to-be-filtered dataset, the to-be-filtered dataset including a plurality of pieces of to-be-filtered source language data; filtering all source language data in the to-be-filtered dataset based on a target data filtering model to obtain target source language data remaining after the filtering, the target data filtering model being obtained through training performed by using a reinforcement learning algorithm; and acquiring markup language data corresponding to the obtained target source language data, and acquiring a machine translation model based on the target source language data and the acquired markup language data. In such a data processing process, a filtering rule in the target data filtering model is automatically learned by a machine in a reinforcement learning process. Apparatus and non-transi- (Continued)

tory computer-readable storage medium counterpart embodiments are also provided.

20 Claims, 8 Drawing Sheets

(56) References Cited

U.S. PATENT DOCUMENTS

| | | | | |
|---|---|---|---|---|
| 2009/0030671 | A1* | 1/2009 | Kwon | G06F 40/42 |
| | | | | 704/2 |
| 2011/0172987 | A1* | 7/2011 | Kent | G06F 40/169 |
| | | | | 704/E11.001 |
| 2017/0083508 | A1* | 3/2017 | Dixon | G06F 40/58 |
| 2017/0249383 | A1* | 8/2017 | Giverts | G06F 16/3337 |
| 2019/0130030 | A1 | 5/2019 | Iguchi | |
| 2019/0244623 | A1* | 8/2019 | Hall | G06T 13/40 |

FOREIGN PATENT DOCUMENTS

| | | |
|---|---|---|
| CN | 107402919 A | 11/2017 |
| CN | 108874790 A | 11/2018 |
| CN | 108920468 A | 11/2018 |
| CN | 110223675 A | 9/2019 |
| CN | 110929532 A | 3/2020 |
| WO | WO2010119615 A1 | 10/2010 |

OTHER PUBLICATIONS

International Search Report issued Dec. 30, 2021, in PCT/ CN2020/119523, (8 pages).
Written Opinion issued Dec. 30, 2020, in PCT/CN2020/119523 (4 pages).
Volodymyr Mnih et al., Human-Level Control Through Deep Reinforcement Learning, Feb. 26, 2015, vol. 518.
Matteo Hessel et al., Combining Improvements in Deep Reinforcement Learning, The Thirty-Second AAAI Conference on Artificial Intelligence (AAAI-18), pp. 3215-3222.
Meng Fang et al., Learning How to Active Learn: A Deep Reinforcement Learning Approach, Aug. 8, 2017.

\* cited by examiner

DATA PROCESSING METHOD, DEVICE, AND STORAGE MEDIUM

RELATED APPLICATIONS

This application is a continuation application of International Application No. PCT/CN2020/119523, entitled "DATA PROCESSING METHOD, DEVICE, AND STORAGE MEDIUM" and filed on Sep. 30, 2020, which claims priority to Chinese Patent Application No. 201911149101.4, entitled "DATA PROCESSING METHOD, APPARATUS. DEVICE, AND STORAGE MEDIUM," and filed on Nov. 21, 2019. The entire disclosures of the above-identified prior applications are incorporated herein by reference in their entirety.

FIELD OF THE TECHNOLOGY

Embodiments of this application relate to the field of computer technologies, including a data processing method, a device, and a storage medium.

BACKGROUND OF THE DISCLOSURE

In the machine translation field, a sufficient amount of bilingual training data is needed to train a precise machine translation model. Bilingual training data includes source language data and markup language data corresponding to the source language data. Usually, costs of obtaining markup language data in bilingual training data are relatively high. Therefore, to acquire high-quality bilingual training data under a constraint of fixed costs, a large amount of source language data needs to be filtered; and then, markup language data corresponding to source language data remaining after the filtering is acquired.

In the related art, source language data is filtered based on term frequency or model confidence. Application scenarios of these filtering rules are comparatively limited, and quality of source language data remaining after the filtering is poor. Consequently, translation performance of a machine translation model acquired based on the source language data remaining after the filtering and markup language data corresponding to the source language data remaining after the filtering is relatively poor.

SUMMARY

Embodiments of this disclosure provide a data processing method, a device, and a storage medium to improve quality of source language data remaining after filtering. The technical solutions are as follows.

According to a first aspect, an embodiment of this disclosure provides a data processing method. The method includes: (1) acquiring a to-be-filtered dataset, the to-be-filtered dataset including a plurality of pieces of to-be-filtered source language data (2) filtering, by processing circuitry, all source language data in the to-be-filtered dataset based on a target data filtering model to obtain target source language data remaining after the filtering, the target data filtering model being obtained through training performed by using a reinforcement learning algorithm; (3) acquiring markup language data corresponding to the obtained target source language data; and (4) acquiring a machine translation model based on the target source language data and the acquired markup language data.

According to another aspect, a data processing apparatus is provided. The apparatus includes processing circuitry configured to (1) acquire a to-be-filtered dataset, the to-be-filtered dataset including a plurality of pieces of to-be-filtered source language data; (2) filter all source language data in the to-be-filtered dataset based on a target data filtering model to obtain target source language data remaining after the filtering, the target data filtering model being obtained through training performed by using a reinforcement learning algorithm; (3) acquire markup language data corresponding to the obtained target source language data; and (4) acquire a machine translation model based on the target source language data and the acquired markup language data.

According to another aspect, a computer device is provided, including processing circuitry and a memory, the memory storing at least one program code, and the at least one program code being loaded and executed by the processing circuitry to implement the data processing method according to the first aspect.

According to another aspect, a non-transitory computer readable storage medium is further provided, storing at least one program code, and the at least one program code being loaded and executed by processing circuitry to implement the data processing method according to the first aspect.

According to another aspect, a computer program product is further provided, storing at least one computer program, and the at least one computer program being loaded and executed by processing circuitry to implement the data processing method according to the first aspect.

The technical solutions provided in the embodiments of this disclosure may bring the following beneficial effects.

All source language data in a to-be-filtered dataset is filtered based on a target data filtering model obtained through training performed by using a reinforcement learning algorithm. Further, a machine translation model is acquired based on target source language data remaining after the filtering and markup language data corresponding to the target source language data. In such a data processing process, a filtering rule in the target data filtering model is automatically learned by a machine in a reinforcement learning process. The target data filtering model has a wide range of application scenarios, and quality of source language data remaining after the filtering is relatively high, so that translation performance of the machine translation model acquired based on the source language data remaining after the filtering and markup language data corresponding to the source language data remaining after the filtering is better.

BRIEF DESCRIPTION OF THE DRAWINGS

To describe the technical solutions of the embodiments of this disclosure more clearly, the following briefly introduces the accompanying drawings for describing the embodiments. The accompanying drawings in the following description show only some embodiments of this disclosure, and a person of ordinary skill in the art may still derive other drawings from these accompanying drawings.

DESCRIPTION OF EMBODIMENTS

To make objectives, technical solutions, and advantages of this disclosure clearer, the following further describes implementations of this disclosure in detail with reference to the accompanying drawings.

Natural language processing (NLP) is an important direction in the fields of computer science and AI. NLP studies various theories and methods for implementing effective communication between human and computers through natural languages. NLP is a science that integrates linguistics, computer science and mathematics. Therefore, studies in this field relate to natural languages, that is, languages used by people in daily life, and NLP is closely related to linguistic studies. The NLP technology generally includes technologies such as text processing, semantic understanding, machine translation, robot question and answer, and knowledge graph. Machine translation is translation of one natural language (the natural language to be translated is generally referred to as a source language) into another natural language (the translated natural language is referred to as a target language) by using a machine, to implement conversion between natural languages in different languages.

Currently, machine translation is usually implemented by using a machine translation model, for example a neural machine translation (NMT) model based on a neural network. A sufficient amount of bilingual training data is needed to train a precise machine translation model. The bilingual training data includes source language data and markup language data corresponding to the source language data. In a process of acquiring bilingual training data, a professional translator is usually needed to manually translate source language data into markup language data. Because costs of manual translation are very high, costs of acquiring the bilingual training data are relatively high. Therefore, to acquire high-quality bilingual training data under a constraint of fixed costs, a large amount of source language data needs to be filtered; and then, markup language data corresponding to source language data remaining after the filtering is acquired, thereby improving translation performance of a machine translation model acquired based on the source language data remaining after the filtering and the markup language data corresponding to the source language data remaining after the filtering.

Figure 1:
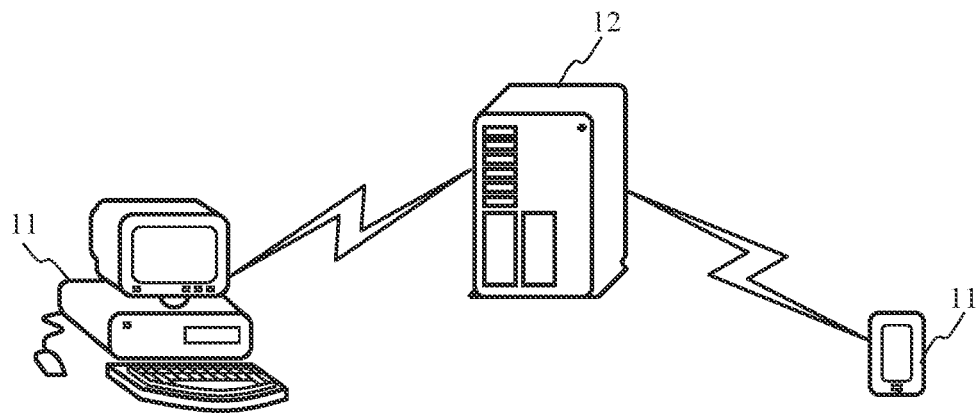
FIG. 1 is a schematic diagram of an implementation environment of a data processing method according to an embodiment of this disclosure.

In view of this, an embodiment of this disclosure provides a data processing method. FIG. 1 is a schematic diagram of an implementation environment of the data processing method according to this embodiment of this disclosure. The implementation environment includes a terminal 11 and a server 12.

The terminal 11 can acquire to-be-filtered source language data from a network and send the to-be-filtered source language data to the server 12. The terminal 11 can further receive source language data remaining after the filtering and returned by the server 12 and present the source language data remaining after the filtering, so that a professional translator translates the source language data remaining after the filtering into markup language data. Then, the terminal 11 sends the markup language data to the server 12. The server 12 can obtain a target data filtering model through training performed by using a reinforcement learning algorithm; and filter, based on the target data filtering model, the to-be-filtered source language data sent by the terminal 11. The server 12 can further send the source language data remaining after the filtering to the terminal 11, and acquire the markup language data that corresponds to the source language data remaining after the filtering and that is sent by the terminal 11. Then, the server 12 can acquire a machine translation model based on the source language data remaining after the filtering and the markup language data corresponding to the source language data remaining after the filtering.

In exemplary embodiments, the terminal 11 can also obtain a target data filtering model through training performed by using a reinforcement learning algorithm, filter acquired to-be-filtered source language data based on the target data filtering model, and further acquire a machine translation model based on source language data remaining after the filtering and markup language data corresponding to the source language data remaining after the filtering.

The terminal 11 can be a smart device such as a mobile phone, a tablet computer, or a personal computer. The server 12 is a server, a server cluster include a plurality of servers, or a cloud computing service center. The terminal 11 establishes a communication connection to the server 12 via a wired or wireless network.

A person skilled in the art can understand that the terminal 11 and the server 12 are merely examples, and other terminals or servers or terminals or servers that may appear in the future are also applicable to this disclosure, are also included in the protection scope of this disclosure, and are included herein by reference.

Figure 2:
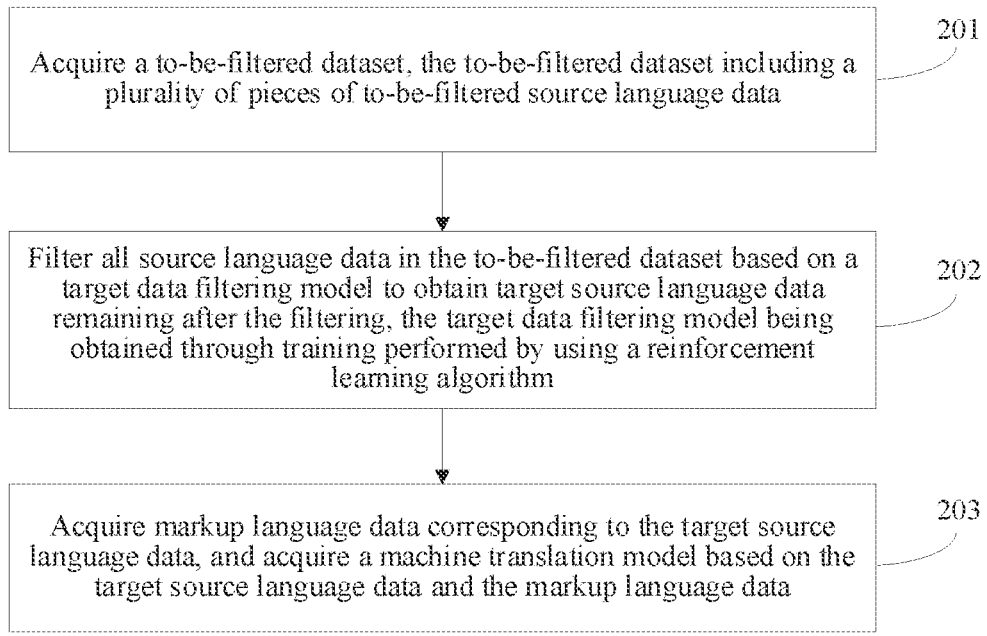
FIG. 2 is a flowchart of a data processing method according to an embodiment of this disclosure.

An embodiment of this disclosure provides a data processing method based on the implementation environment shown in FIG. 1. The method is applicable to a computer device, and the computer device is a server or a terminal. An example in which the method is applicable to the server is used in this embodiment of this disclosure. As shown in FIG. 2, the method provided in this embodiment of this disclosure includes the following steps.

In Step 201, a to-be-filtered dataset is acquired, the to-be-filtered dataset including a plurality of pieces of to-be-filtered source language data.

The to-be-filtered dataset is a dataset requiring filtering. The to-be-filtered dataset includes the plurality of pieces of to-be-filtered source language data. In this embodiment of this disclosure, a language corresponding to source language data is referred to as a first language. For example, the source language data is sentences in the first language.

In one implementation, methods in which the server acquires the to-be-filtered dataset include, but are not limited to the following two methods.

Method 1: The server acquires the to-be-filtered dataset from a database of the first language.

In one implementation, the server randomly selects a first reference quantity of sentences from the database of the first language to form the to-be-filtered dataset. The first reference quantity is determined based on an amount of to-be-acquired bilingual data or is flexibly adjusted based on an actual situation. This is not limited in this embodiment of this disclosure.

Method 2: The server receives network data sent by the terminal, parses sentences in the first language out of the network data, and acquires the to-be-filtered dataset based on the parsed sentences in the first language.

The terminal can acquire the network data in a process of processing an internet service, and the network data may include sentences in different languages. After the terminal sends the network data to the server, the server can parse the sentences in the first language out of the network data. In one implementation, a process in which the server acquires the to-be-filtered dataset based on the parsed sentences in the first language includes the server selecting the first reference quantity of sentences from the parsed sentences in the first language to form the to-be-filtered dataset.

After the server acquires the to-be-filtered dataset, step 202 may be performed.

In an actual application scenario, a sufficient amount of bilingual training data is needed to train a precise machine translation model. However, when one of the bilingual languages is an uncommon language, an amount of bilingual training data in a bilingual database may be relatively small. In this case, the server needs to acquire new bilingual training data to expand the bilingual database. Costs of acquiring the new bilingual training data are relatively high. Therefore, the server first needs to filter a large amount of to-be-filtered source language data based on step 202 to improve quality of the acquired bilingual training data.

In Step 202, all source language data in the to-be-filtered dataset is filtered based on a target data filtering model to obtain target source language data remaining after the filtering, the target data filtering model being obtained through training performed by using a reinforcement learning algorithm.

The server may filter all the source language data in the to-be-filtered dataset based on the target data filtering model after acquiring the to-be-filtered dataset, to obtain the target source language data remaining after the filtering. The target data filtering model is obtained through training performed by using the reinforcement learning algorithm. In other words, a filtering rule of the target data filtering model is automatically learned by a machine in a reinforcement learning process. The filtering rule of the target data filtering model can be applicable to various different scenarios and has a wide application range.

In one implementation, a process in which the server filters all the source language data in the to-be-filtered dataset based on the target data filtering model to obtain the target source language data remaining after the filtering is: acquiring features of all the source language data in the to-be-filtered dataset, and inputting the features of all the source language data to the target data filtering model; processing, by the target data filtering model, the features of all the source language data, and outputting filtering results of all the source language data; and obtaining, by the server based on the filtering results of all the source language data, the target source language data remaining after the filtering.

A method for acquiring the features of all the source language data in the to-be-filtered dataset is not limited in this embodiment of this disclosure. For example, for any source language data in all the source language data, a feature or the like of the source language data is acquired based on a word embedding feature corresponding to each piece of subdata in the source language data and a length of the source language data. For example, a feature of any source language data is represented in a vector form.

In one implementation, methods in which the server inputs the features of all the source language data to the target data filtering model include but are not limited to the following two methods.

Method 1: The server inputs a feature of one piece of source language data to the target data filtering model for processing each time, until the features of all the source language data are input to the target data filtering model.

In method 1, the target data filtering model outputs a filtering result of one piece of source language data each time.

Method 2: The server divides all the source language data into a second reference quantity of source language data groups, and inputs features of all source language data in one source language data group to the target data filtering model for processing each time, until the features of all the source language data in all source language data groups are input to the target data filtering model.

In method 2, the target data filtering model outputs filtering results of all source language data in one source language data group each time. The second reference quantity is set based on experience or is flexibly adjusted based on an application scenario. This is not limited in this embodiment of this disclosure. For example, when the second reference quantity is set to 1, the features of all the source language data are input, in the same batch, to the target data filtering model for processing; and the target data filtering model outputs the filtering results of all the source language data in the same batch.

In one implementation, the filtering result is a first result or a second result. The first result is used for indicating that the reliability of the source language data is high, and the second result is used for indicating that the reliability of the source language data is low. For any source language data, when a filtering result of the source language data is the first result, it indicates that the reliability of the source language data is high, in other words, the source language data is high-quality source language data; and when the filtering result of the source language data is the second result, it indicates that the reliability of the source language data is low, in other words, the source language data is low-quality source language data.

In one implementation, the first result and the second result are respectively represented by using a value one and a value zero. When a filtering result of source language data that is output by the target data filtering model is one, it indicates that the filtering result of the source language data is the first result. When a filtering result of source language data that is output by the target data filtering model is zero, it indicates that the filtering result of the source language data is the second result.

In one implementation, a manner in which the server obtains the target source language data remaining after the filtering based on the filtering results of all the source language data is that the server uses source language data with a filtering result being the first result as the target source language data remaining after the filtering.

After obtaining the target source language data remaining after the filtering, the server may perform step 203 based on the target source language data remaining after the filtering.

Before performing step 202, the server first needs to obtain the target data filtering model through training performed by using the reinforcement learning algorithm. For details about a process of obtaining the target data filtering model through training performed by using the reinforcement learning algorithm, refer to the embodiment shown in step 301 to step 303. Details are not described herein again.

In Step 203, markup language data corresponding to the target source language data is acquired, and a machine translation model is acquired based on the target source language data and the markup language data.

Because the source language data remaining after the filtering is high-quality source language data, the source language data remaining after the filtering is used as the target source language data. Further, the markup language data corresponding to the target source language data is acquired. In this embodiment of this disclosure, a language corresponding to the markup language data is referred to as a second language. For example, the markup language data is sentences in the second language.

In one implementation, the markup language data is obtained by translating the target source language data by a professional translator. A process in which the server acquires the markup language data corresponding to the target source language data is as follows: (1) the server sends the target source language data to the terminal; (2) the terminal presents the target source language data to the professional translator, and the professional translator views the target source language data and manually translates the target source language data; (3) the terminal acquires the markup language data corresponding to the target source language data when a translation confirmation instruction of the professional translator is detected; and (4) the terminal sends the markup language data corresponding to the target source language data to the server. In this way, the server acquires the markup language data corresponding to the target source language data.

After acquiring the markup language data corresponding to the target source language data, the server acquires the machine translation model based on the target source language data and the markup language data. In a process of acquiring the machine translation model based on the target source language data and the markup language data, the server directly acquires the machine translation model through training performed based on the target source language data and the markup language data; or the server adds the target source language data and the markup language data to bilingual training data to obtain expanded bilingual training data, and then acquires the machine translation model through training performed based on the expanded bilingual training data. A specific manner for acquiring the machine translation model is not limited in this embodiment of this disclosure.

In an actual application process, translation performance of the machine translation model acquired according to the method provided in this embodiment of this disclosure and translation performance of a machine translation model acquired according to another method are compared by way of experiments. An experiment process is: (1) in a to-be-filtered dataset, acquiring target source language data of a target amount according to the method provided in this embodiment of this disclosure, acquiring markup language data corresponding to the target source language data, using the target source language data and the markup language data corresponding to the target source language data as a first bilingual training sample, and performing training based on the first bilingual training sample to obtain a translation model 1; (2) in the same the to-be-filtered dataset, randomly selecting selected source language data of a target amount, acquiring markup language data corresponding to the selected source language data, using the selected source language data and the markup language data corresponding to the selected source language data as a second bilingual training sample, and performing training based on the second bilingual training sample to obtain a translation model 2; and (3) separately testing translation performance of the translation model 1 and the translation model 2 on a Workshop on Machine Translation (WMT) field test set, an economic field test set, and a political field test set.

An example in which the source language data is Chinese data and the markup language data is English data (Chinese to English machine translation) and an example in which the source language data is English data and the markup language data is Chinese data (English to Chinese machine translation) are used, and comparison results of the performance of the translation model 1 and the translation model 2 are shown in Table 1.

TABLE 1

| Model/ BLEU value | Chinese to English machine translation | | | English to Chinese machine translation | | |
| --- | --- | --- | --- | --- | --- | --- |
| | WMT | Economy | Politics | WMT | Economy | Politics |
| Translation model 1 | 20.23 | 23.57 | 20.48 | 18.32 | 20.08 | 24.90 |
| Translation model 2 | 20.74 | 24.07 | 21.41 | 18.63 | 20.78 | 25.22 |

As can be learned from Table 1, the translation model 1 acquired according to the method provided in this embodiment has higher translation performance than the translation model 2 on the test sets in various fields regardless of whether in the Chinese to English machine translation or in the English to Chinese machine translation. The translation performance is represented by using a bilingual evaluation understudy (BLEU) value.

In a machine translation task, to achieve pre-determined machine translation performance, more effective source language data with higher quality can be acquired by using the method provided in this embodiment. The method can reduce translation costs of the professional translator and has important value in reducing budget and costs.

In this embodiment, all source language data in a to-be-filtered dataset is filtered based on a target data filtering model obtained through training performed by using a reinforcement learning algorithm. Further, a machine translation model is acquired based on target source language data remaining after the filtering and markup language data corresponding to the target source language data. In such a data processing process, a filtering rule in the target data filtering model is automatically learned by a machine in a reinforcement learning process. The target data filtering model has a wide range of application scenarios, and quality of source language data remaining after the filtering is relatively high, so that translation performance of the machine translation model acquired based on the source language data remaining after the filtering and markup language data corresponding to the source language data remaining after the filtering is better.

Figure 3:
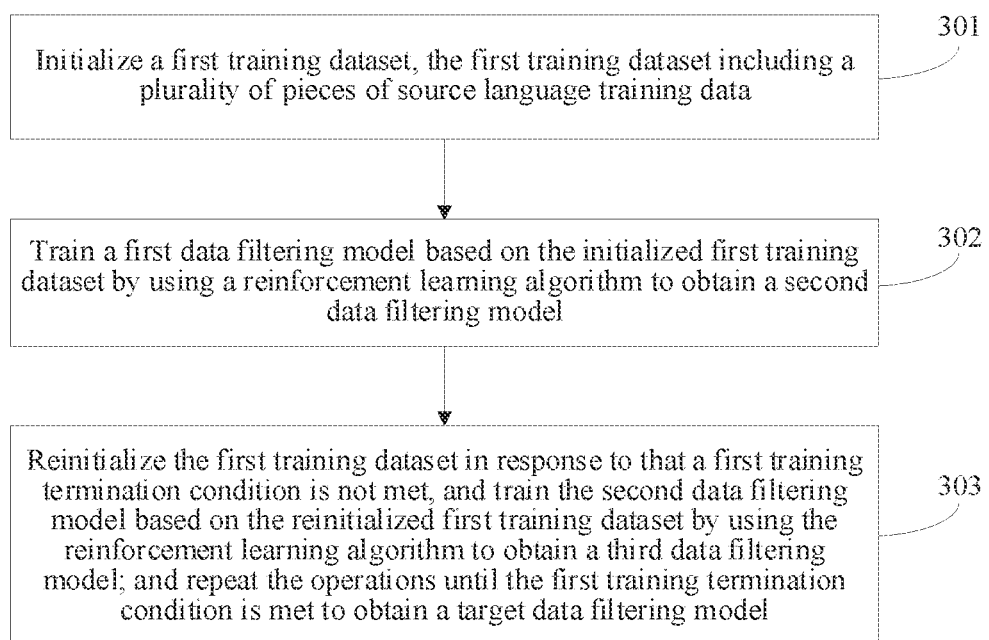
FIG. 3 is a flowchart of a data processing method according to an embodiment of this disclosure.

An embodiment of this disclosure provides a method for obtaining a target data filtering model through training performed by using a reinforcement learning algorithm. An example in which the method is applied to a server is used. As shown in FIG. 3, the method provided in this embodiment of this application includes the following steps.

In Step 301, a first training dataset is initialized, the first training dataset including a plurality of pieces of source language training data.

The first training dataset is a to-be-filtered dataset to obtain a target data filtering model through training. The first training dataset includes the plurality of pieces of source language training data. The source language training data is to-be-filtered source language data to obtain the target data filtering model through training.

In one implementation, a manner for initializing the first training dataset is randomly initializing the first training dataset or initializing the first training dataset based on a preset setting. This is not limited in this embodiment of this disclosure.

In one implementation, a process of randomly initializing the first training dataset includes randomly shuffling a sequence of all the source language training data in the first training dataset. Randomly initializing the first training dataset facilitates improvement of a generalization capability of the target data filtering model obtained through training.

In Step 302, a first data filtering model is trained based on the initialized first training dataset by using the reinforcement learning algorithm to obtain a second data filtering model.

The first data filtering model is an initial data filtering model corresponding to the initialized first training dataset, and the second data filtering model is a final data filtering model corresponding to the initialized first training dataset. A specific form of a data filtering model is not limited in this embodiment. For example, the data filtering model is a deep Q-Learning (DQN) model.

Figure 4:
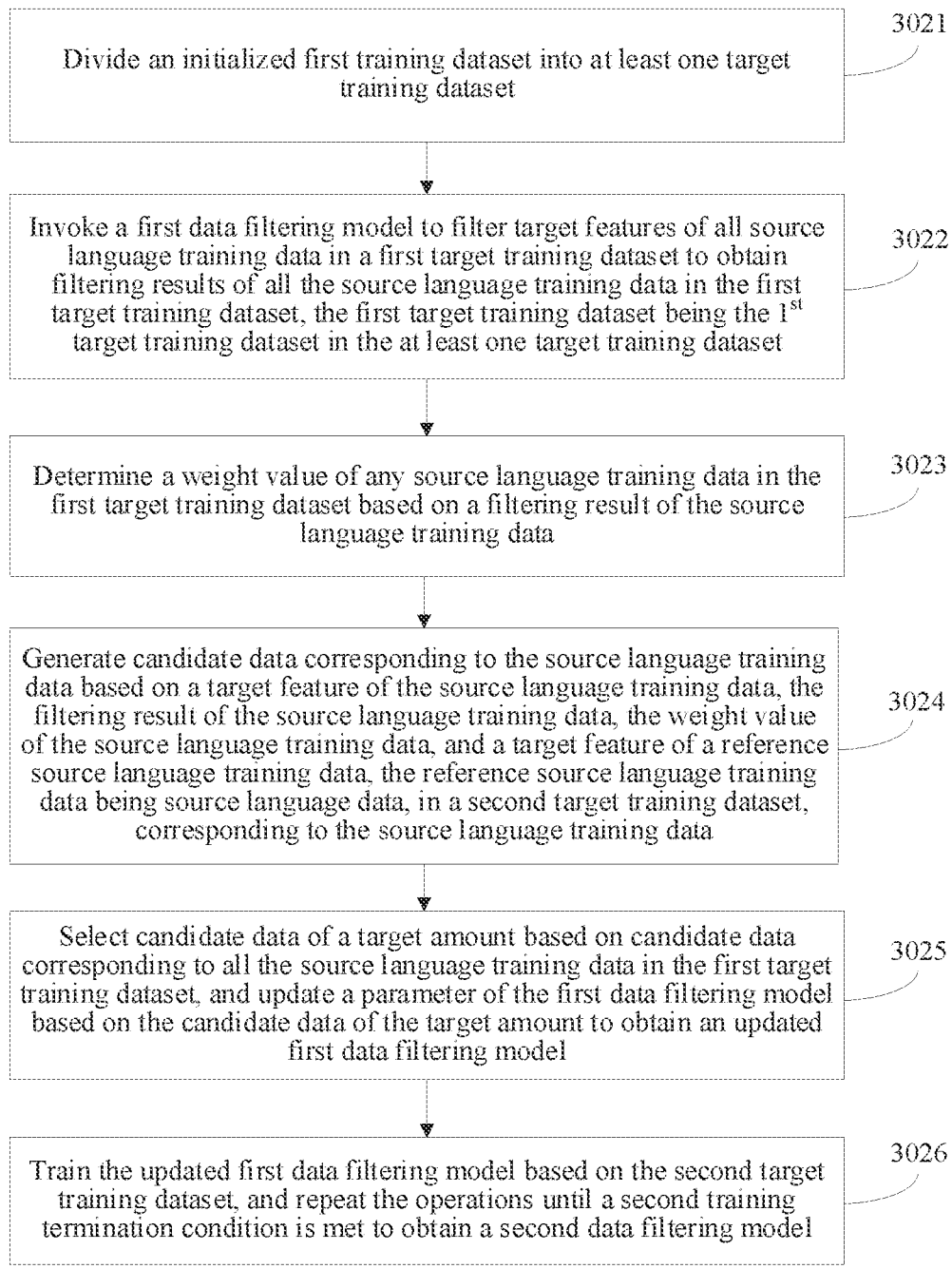
FIG. 4 is a flowchart of a method for acquiring a second data filtering model according to an embodiment of this disclosure.

In Step 302, a process of obtaining the second data filtering model is performed, that is, obtaining the final data filtering model corresponding to the initialized first training dataset. As shown in FIG. 4, the process includes step 3021 to step 3026.

In Step 3021, the initialized first training dataset is divided into at least one target training dataset.

The initialized first training dataset includes a plurality of pieces of source language training data. The initialized first training dataset is divided into the at least one target training dataset, so that each target training dataset includes some source language training data in the initialized first training dataset.

After the initialized first training dataset is divided into the at least one target training dataset, in the process of obtaining the second data filtering model corresponding to the initialized first training dataset, one target training dataset is used for training each time.

Compared with a manner of performing training by using one piece of source language training data each time, this manner can shorten a training time and improve stability of a training process. After the initialized first training dataset is divided into the at least one target training dataset, all the target training datasets are arranged in sequence. In a subsequent training process, all the target training datasets are sequentially selected based on the sequence. According to the sequence, all the target training datasets are sequentially a first target training dataset, a second target training dataset, . . . and an $n^{th}$ target training dataset (n is an integer greater than 0).

In one implementation, a quantity n of the target training datasets is determined based on a total amount M of the source language training data in the first training dataset and a mini-batch size S. and a determining manner is n=M/S. The mini-batch size S is set based on experience or is adjusted based on a total amount of source language training data. This is not limited in this embodiment. For example, the mini-batch size is set to 16. To be specific, each target training dataset includes 16 pieces of source language training data. In this case, the quantity of the target training datasets meets that n=M/16.

In Step 3022, the first data filtering model is invoked to filter target features of all source language training data in the first target training dataset to obtain filtering results of all the source language training data in the first target training dataset, the first target training dataset being the first target training dataset in the at least one target training dataset.

In one implementation, before step 3022 is implemented, the target features of all the source language training data in the first target training dataset need to be acquired first. That is, after the initialized first training dataset is divided into the at least one target training dataset, the target features of all the source language training data in the first target training dataset are acquired. The first target training dataset is the first target training dataset in the at least one target training dataset.

In one implementation, a process of acquiring a target feature of any source language training data in the first target training dataset includes the following substeps 3022A to 3022C.

In Step 3022A, a first feature of any source language training data is acquired based on all subdata in the source language training data.

The first feature is used for indicating a feature of the source language training data, and the first feature is acquired based on all the subdata in the source language training data. Any source language training data includes a plurality of pieces of subdata. For example, when any source language training data is a sentence, each word in the source language training data is one piece of subdata in the source language training data.

In one implementation, a process of acquiring a first feature of any source language training data based on all subdata in the source language training data includes the following steps 1 to 4.

In Step 1, a third feature of the source language training data is acquired based on word-embedding features of all the subdata in the source language training data.

The word-embedding features of all the subdata in the source language training data are queried based on a word list. The word-embedding features of all the subdata are padded to the same length. The third feature of the source language training data can be acquired based on the word-embedding features of all the subdata with the same length.

The word list is a list storing word-embedding features of various words. The word list can be constructed based on a corpus. A process of constructing the word list is not limited in this embodiment. A word-embedding feature corresponding to each word in the word list can be represented by using a vector. A dimension of the vector is set based on experience. For example, the dimension of the vector is set to 512.

Figure 5:
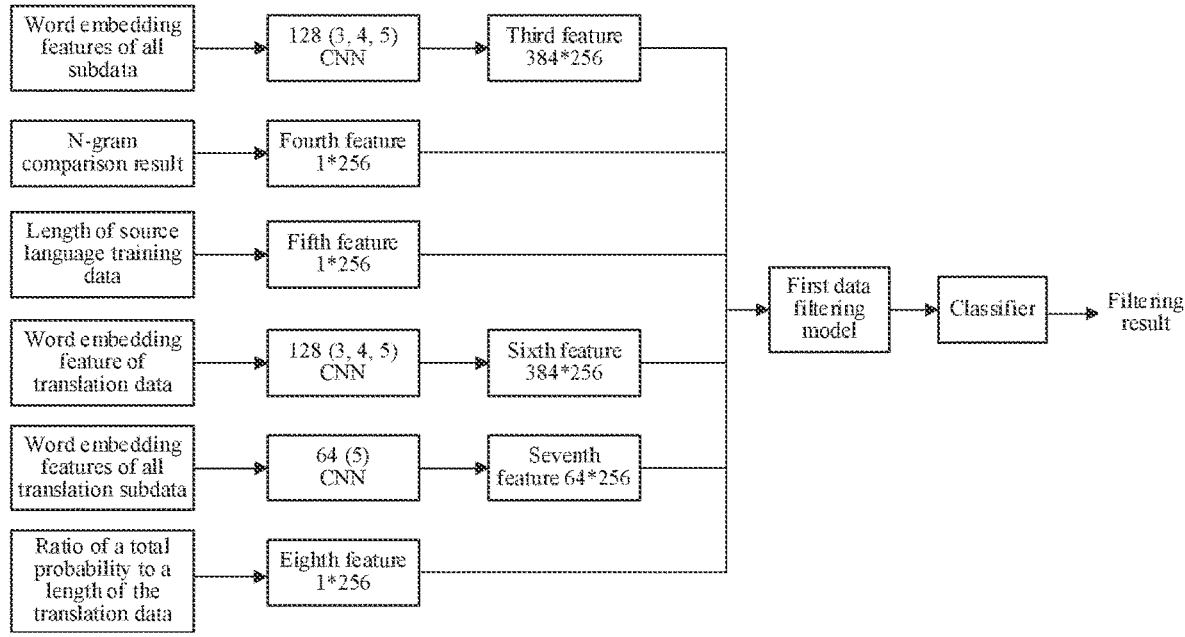
FIG. 5 is a schematic diagram of a process of acquiring a filtering result of any source language training data in a first target training dataset according to an embodiment of this disclosure.

In one implementation, a method for acquiring the third feature of the source language training data based on the word-embedding features of all the subdata with the same length includes inputting the word embedding features of all the subdata with the same length to a first neural network, and using a feature obtained through processing of a convolutional layer and a fully connected layer in the first neural network as the third feature of the source language training data. Settings of the convolutional layer and the fully connected layer in the first neural network are not limited in this embodiment. For example, the convolutional layer further includes a Rectified Linear Unit (ReLU) processing module. For example, as shown in FIG. 5, the first neural network is a convolutional neural network (CNN); a filter size of the convolutional layer is separately set to 3, 4, and 5; and a filter number is set to 128. A feature vector with a dimension of 384*256 is obtained after processing of the fully connected layer, and the feature vector is used as the third feature.

In Step 2, a fourth feature of the source language training data is acquired based on comparison results between all the subdata in the source language training data and a corpus database.

By comparing all the subdata in the source language training data with the corpus database, statistics about probabilities that N-gram subdata in the source language training data appears in the corpus database can be collected. The probabilities that the N-gram subdata in the source language training data appears in the corpus database are used as the comparison results. Then, the fourth feature of the source language training data is acquired based on the comparison results. For example, the N-gram includes one or more of 2-gram, 3-gram, and 4-gram.

In one implementation, a method for acquiring the fourth feature of the source language training data based on the comparison results includes inputting the comparison results to a second neural network, and using a feature obtained through processing of the second neural network as the fourth feature of the source language training data. A setting of the second neural network is not limited in this embodiment. For example, as shown in FIG. 5, a feature vector with a dimension of 1*256 is obtained after processing of the second neural network, and the feature vector is used as the fourth feature.

In Step 3, a length of the source language training data is determined based on an amount of all the subdata in the source language training data, and acquire a fifth feature of the source language training data based on the length of the source language training data.

A length of any source language training data may be determined based on an amount of subdata in the source language training data. For example, when any source language training data is a sentence and subdata is words, a quantity of words included in the sentence is a length of the sentence.

In one implementation, a method for acquiring the fifth feature of the source language training data based on the length of the source language training data includes inputting the length of the source language training data to a third neural network, and using a feature obtained through processing of the third neural network as the fifth feature of the source language training data. A setting of the third neural network is not limited in this embodiment. For example, as shown in FIG. 5, a feature vector with a dimension of 1*256 can be obtained after processing of the third neural network, and the feature vector is used as the fifth feature.

In Step 4, the first feature of the source language training data is acquired based on the third feature, the fourth feature, and the fifth feature.

The first feature of the source language training data may be acquired after the third feature, the fourth feature, and the fifth feature of the source language training data are acquired according to steps 1 to 3. In one implementation, a method for acquiring the first feature of the source language training data based on the third feature, the fourth feature, and the fifth feature includes splicing the third feature, the fourth feature, and the fifth feature of the source language training data together to acquire the first feature.

In Step 3022B, a second feature of the source language training data is acquired based on the source language training data and a third translation model.

The second feature is used for indicating a feature of the source language training data that is obtained based on comprehensively considering a translation result of the third translation model. For example, the third translation model is any model that can translate source language training data. This is not limited in this embodiment. In one implementation, a process of acquiring the second feature of the source language training data based on the source language training data and the third translation model includes the following steps a to d.

In Step a, translation data of the source language training data is acquired based on the third translation model, and acquire a sixth feature of the source language training data based on a word-embedding feature of the translation data.

A process of acquiring the translation data of the source language training data based on the third translation model includes inputting the source language training data to the third translation model, and using translation data that is output by the third translation model as the translation data of the source language training data.

The word-embedding feature of the translation data of the source language training data is queried in the word list after the translation data is acquired, and the sixth feature of the source language training data is acquired based on the word-embedding feature of the translation data. A word-embedding feature can be represented by using a vector. A dimension of the vector is set based on experience. For example, the dimension of the vector is set to 512.

In one implementation, a method for acquiring the sixth feature of the source language training data based on the word-embedding feature of the translation data includes inputting the word-embedding feature of the translation data to a sixth neural network, and using a feature obtained through processing of a convolutional layer and a fully connected layer in the fourth neural network as the sixth feature of the source language training data. Settings of the convolutional layer and the fully connected layer in the fourth neural network are not limited in this embodiment. In exemplary embodiments, the convolutional layer further includes an ReLU processing module. For example, as shown in FIG. 5, the fourth neural network is a CNN; a filter size of the convolutional layer is separately set to 3, 4, and 5; and a filter number is set to 128. A feature vector with a dimension of 384*256 can be obtained after processing of the fully connected layer, and the feature vector is used as the sixth feature. In exemplary embodiments, the fourth neural network is the same as the first neural network.

In Step b, target translation subdata corresponding to all the subdata in the source language training data is acquired based on the third translation model, and acquire a seventh feature of the source language training data based on word embedding features of the target translation subdata corresponding to all the subdata, a translation probability of target translation subdata corresponding to any subdata being the largest among translation probabilities of all candidate translation subdata corresponding to the subdata.

The candidate translation subdata that corresponds to all the subdata in the source language training data and that is output by the third translation model and the translation probabilities of the candidate translation subdata can be obtained by inputting the source language training data to the third translation model. In one implementation, an amount of candidate translation subdata corresponding to any subdata is set based on experience. For example, if the amount of the candidate translation subdata is set to 10, the third translation model outputs 10 pieces of candidate translation subdata that has largest translation probabilities and that corresponds to all subdata and the translation probabilities of the 10 pieces of candidate translation subdata.

The target translation subdata corresponding to all the subdata in the source language training data can be determined based on the candidate translation subdata corresponding to all the subdata in the source language training data and the translation probabilities of the candidate translation subdata. Target translation subdata corresponding to any subdata is candidate translation subdata with a largest translation probability among all candidate translation subdata corresponding to the subdata. The word list is searched for the word-embedding features of the target translation subdata corresponding to all the subdata. The word-embedding features of the target translation subdata corresponding to all the subdata are padded to the same length. The seventh feature of the source language training data is acquired based on the word-embedding features of the target translation subdata corresponding to all the subdata with the same length.

In one implementation, a method for acquiring the seventh feature of the source language training data based on the word-embedding features of the target translation subdata corresponding to all the subdata with the same length includes inputting the word-embedding features of the target translation subdata corresponding to all the subdata with the same length to a fifth neural network, and using a feature obtained through processing of a convolutional layer and a fully connected layer in the fifth neural network as the seventh feature of the source language training data. Settings of the convolutional layer and the fully connected layer in the fifth neural network are not limited in this embodiment. For example, the convolutional layer further includes an ReLU processing module. For example, as shown in FIG. 5, the fifth neural network is a convolutional neural network (CNN), a filter size of the convolutional layer is set to 5, and a filter number is set to 64. A feature vector with a dimension of 64*256 is obtained after processing of the fully connected layer, and the feature vector is used as the seventh feature. In the exemplary embodiments, the fifth neural network is the same as the first neural network or the fourth neural network.

In Step c, translation probabilities of the target translation subdata corresponding to all the subdata are acquired, and an eighth feature of the source language training data is acquired based on the translation probabilities of the target translation subdata corresponding to all the subdata and a length of the translation data.

The translation probabilities of the target translation subdata corresponding to all the subdata can further be acquired according to step b. In one implementation, a process of acquiring the eighth feature of the source language training data based on the translation probabilities of the target translation subdata corresponding to all the subdata and the length of the translation data includes adding the translation probabilities of the target translation subdata corresponding to all the subdata to obtain a total probability, and acquiring the eighth feature of the source language training data based on a ratio of the total probability to the length of the translation data. For example, the eighth feature is used for indicating indicate a confidence score of the source language training data.

In one implementation, a method for acquiring the eighth feature of the source language training data based on the ratio of the total probability to the length of the translation data includes inputting the ratio of the total probability to the length of the translation data to a sixth neural network, and using a feature obtained through processing of the sixth neural network as the eighth feature of the source language training data. A setting of the sixth neural network is not limited in this embodiment. For example, as shown in FIG. 5, a feature vector with a dimension of 1*256 can be obtained after processing of the sixth neural network, and the feature vector is used as the eighth feature.

In Step d, the second feature of the source language training data is acquired based on the sixth feature, the seventh feature, and the eighth feature.

The second feature of the source language training data may be acquired after the sixth feature, the seventh feature, and the eighth feature of the source language training data are acquired according to step a to step d. In one implementation, a method for acquiring the second feature of the source language training data based on the sixth feature, the seventh feature, and the eighth feature includes splicing the sixth feature, the seventh feature, and the eighth feature of the source language training data together to acquire the second feature.

An execution sequence of step 3022A and step 3022B is not limited in this embodiment. In exemplary embodiments, step 3022A is performed first, and then step 3022B is performed; step 3022B is performed first, and then step 3022A is performed; or step 3022A and step 3022B are performed at the same time.

In Step 3022C, a target feature of the source language training data is acquired based on the first feature and the second feature.

After the first feature and the second feature of the source language training data are acquired, the target feature of the source language training data is acquired based on the first feature and the second feature. In one implementation, a method for acquiring the target feature of the source language training data based on the first feature and the second feature includes splicing the first feature and the second feature, and using a feature obtained through splicing as the target feature of the source language training data. A splicing sequence of the first feature and the second feature is not limited in this embodiment.

In one implementation, because the first feature is acquired based on the third feature, the fourth feature, and the fifth feature and the second feature is acquired based on the sixth feature, the seventh feature, and the eighth feature, the target feature of the source language training data can be acquired based on the third feature, the fourth feature, the fifth feature, the sixth feature, the seventh feature, and the eighth feature of the source language training data.

Target features of all the source language training data in the first target training dataset can be acquired in the methods in the foregoing step 3022A to step 3022C. Then, the first data filtering model is invoked to filter the target features of all the source language training data in the first target training dataset.

After the target features of all the source language training data in the first target training dataset are input to the first data filtering model, the first data filtering model processes the target features of all the source language training data. After processing the target features, the first data filtering model outputs a filtering result of each piece of source language training data based on a classifier. For example, a process of obtaining the filtering results of all the source language training data in the first target training dataset is shown in FIG. 5.

A method in which the first data filtering model processes a target feature is not limited in this embodiment. For example, the first data filtering model processes a target feature by using two fully connected layers. A fully connected feature of source language training data is obtained after the target feature is processed by using the first fully connected layer. The fully connected feature is sent to the other fully connected layer. Probabilities of different filtering results corresponding to the source language training data are output based on a formula $a_i=\text{argmax } Q^\pi(s_i,a)$. Then, a filtering result with a largest probability is output by using the classifier, to serve as a filtering result of the source language training data. In the formula $a_i=\text{argmax } Q^\pi(s_i,a)$, $a_i$ represents a filtering result, and $Q^\pi(s_i,a)$ represents a target function corresponding to the first data filtering model. As such, the server can obtain the filtering results of all the source language training data in the first target training dataset.

In one implementation, there are two types of filtering results: a first result and a second result. The first result is used for indicating that the reliability of the source language training data is high, and the second result is used for indicating that the reliability of the source language training data is low. For example, a filtering result is represented by using a value, and a correspondence between a filtering result and a value is preset based on experience. For example, a value corresponding to the first result is 1, and a value corresponding to the second result is 0.

In Step 3023, a weight value of any source language training data in the first target training dataset is determined based on a filtering result of the source language training data.

Source language training data of different filtering results correspond to different weight values. In one implementation, a process of determining the weight value of the source language training data based on the filtering result of the source language training data includes using a first weight value as the weight value of the source language training data in response to that the filtering result of the source language training data is the first result, and using a second weight value as the weight value of the source language training data in response to that the filtering result of the source language training data is the second result.

In one implementation, the second weight value is a preset weight value corresponding to the source language training data whose filtering result is the second result. A method for setting the second weight value is not limited in this embodiment. For example, the second weight value is set to 0.

In one implementation, the first weight value needs to be acquired before the first weight value is used as the weight value of the source language training data. A process of acquiring the first weight value includes the following steps A to D.

In Step A, markup language training data corresponding to all target source language training data in the first target training dataset is acquired, filtering results of all the target source language training data being first results.

When a filtering result of source language training data is the first result, it indicates that the reliability of the source language training data is high. All the source language training data whose filtering results are first results in the first target training dataset is used as all target source language training data. Then, the markup language training data corresponding to all the target source language training data is acquired.

In exemplary embodiments, markup language training data corresponding to all source language training data in the first training dataset is acquired in advance and stored before training. The markup language training data corresponding to all the target source language training data is acquired from a memory when step A is performed, to save a training time.

The markup language training data corresponding to all the target source language training data whose filtering results are first results in the first target training dataset may be acquired according to step A. Then, step B is performed.

In Step B, all the target source language training data and the markup language training data corresponding to all the target source language training data is added as training data to a second training dataset.

An initial value of the second training dataset is an empty set. The second training dataset is used for storing bilingual training data. Any bilingual training data includes one piece of source language training data and markup language data corresponding to the source language training data.

All the target source language training data and the markup language training data corresponding to all the target source language training data may be added to the second training dataset as training data after the markup language training data corresponding to all the target source language training data is acquired. For example, if any target source language training data is denoted as $x_i$, markup language training data corresponding to $x_i$ is denoted as $y_i$, and the second training dataset is denoted as $D_j$, $(x_i, y_i)$ is added to $D_j$.

All the target source language training data whose filtering results are first results in the first target training dataset and the markup language training data corresponding to all the target source language training data are correspondingly added to the second training dataset after step B. The second training dataset obtained in this manner can improve accuracy of acquiring the first weight value.

In Step C, a first translation model is trained based on the second training dataset to obtain a second translation model.

The first translation model is a translation model obtained through pre-training performed by using bilingual training data. A specific form of the first translation model is not limited in this embodiment of this application. For example, the first translation model is a neural machine translation (NMT) model.

An updated second training dataset is obtained after step B. Because all data in the second training dataset are bilingual training data, the first translation model can be trained based on the second training dataset. A method for training the first translation model is not limited in this embodiment. The translation model obtained through training is used as the second translation model.

In Step D, the first weight value is acquired based on the second translation model and the first translation model.

The first weight value is used for indicating a performance difference between the second translation model and the first translation model. In one implementation, a process of acquiring the first weight value based on the second translation model and the first translation model includes separately verifying the first translation model and the second translation model by using a verification data set (held out dataset) to obtain model performance of the first translation model and model performance of the second translation model, and acquiring the first weight value based on the model performance of the first translation model and the model performance of the second translation model.

In one implementation, the first weight value is acquired based on the following formula 1:

$$R(s_{i-1},a)=\text{Acc}(\Phi_i)-\text{Acc}(\Phi_{i-1}) \quad \text{(Formula 1)}$$

In the formula, $\text{Acc}(\Phi_i)$ represents the model performance of the second translation model, $\text{Acc}(\Phi_{i-1})$ represents the model performance of the first translation model, and $R(s_{i-1},a)$ represents the first weight value (reward). A value of the first weight value may be positive or negative, indicating that a bilingual training sample $(x_i, y_i)$ added to the second training dataset $D_I$ may have a positive or a negative impact on the model performance.

After the first weight value is acquired, the first weight value may be used as the weight value of each piece of the source language training data whose filtering result is the first result in the first target training dataset.

In Step 3024, candidate data corresponding to the source language training data is generated based on a target feature of the source language training data, the filtering result of the source language training data, the weight value of the source language training data, and a target feature of reference source language training data, the reference source language training data being source language data, in the second target training dataset, corresponding to the source language training data.

The second target training dataset is a next target training dataset of the first target training dataset in the at least one target training dataset. The candidate data is data used for updating a parameter of the first data filtering model.

In one implementation, a manner for generating the candidate data corresponding to the source language training data includes (1) generating first candidate data corresponding to the source language training data based on the target feature of the source language training data, the first result, the first weight value, and the target feature of the reference source language training data when the filtering result of the source language training data is the first result; and (2) generating second candidate data corresponding to the source language training data based on the target feature of the source language training data, the second result, the second weight value, and the target feature of the reference source language training data in response to that the filtering result of the source language training data is the second result.

In other words, each piece of source language training data corresponds to one piece of candidate data, and the candidate data is first candidate data or second candidate data. If a target feature of any source language training data is denoted as $s_i$, a filtering result is denoted as $a_i$, a weight value is denoted as $r_i$, a target feature of reference source language training data is denoted as $s_{i+1}$, candidate data corresponding to the source language training data is denoted as $(s_i, a_i, r_i, s_{i+1})$, where $a_i$ and $r_i$ are determined based on the filtering result of the source language training data. When $a_i$ represents the first result, $r_i$ represents the first weight value, and $(s_i, a_i, r_i, s_{i+1})$ represents the first candidate data; when $a_r$ represents the second result, $r_i$ represents the second weight value, and $(s_i, a_i, r_i, s_{i+1})$ represents the second candidate data.

Steps 3023 and 3024 describe the process of generating the candidate data corresponding to the source language training data from the perspective of the source language training data in the first target training dataset. Candidate data corresponding to all the source language training data in the first target training dataset can be generated in the manner of step 3023 and step 3024. Step 3025 is performed after the candidate data corresponding to all the source language training data in the first target training dataset is generated.

In Step 3025, candidate data of a target amount are selected based on the candidate data corresponding to all the source language training data in the first target training dataset, and the parameter of the first data filtering model is updated based on the candidate data of the target amount to obtain an updated first data filtering model.

After the candidate data corresponding to all the source language training data in the first target training dataset is generated, the candidate data of the target amount is selected based on the candidate data corresponding to all the source language training data in the first target training dataset, to update the parameter of the first data filtering model based on the candidate data of the target amount. The target amount is set based on experience or is flexibly adjusted based on an amount of all candidate data. This is not limited in this embodiment of this disclosure.

In one implementation, a method for selecting the candidate data of the target amount based on the candidate data corresponding to all the source language training data in the first target training dataset includes randomly selecting the candidate data of the target amount from the candidate data corresponding to all the source language training data in the first target training dataset.

In one implementation, a method for selecting the candidate data of the target amount based on the candidate data corresponding to all the source language training data in the first target training dataset includes adding the first candidate data in the candidate data corresponding to all the source language training data in the first target training dataset to a first candidate dataset, and adding the second candidate data in the candidate data corresponding to all the source language training data in the first target training dataset to a second candidate dataset; and performing equal ratio selection in the first candidate dataset and the second candidate dataset to obtain the candidate data of the target amount. The candidate data selected in such a manner is more representative, and facilitates improvement of stability of a training process of a data filtering model.

The first candidate dataset is used for continuously collecting newly generated first candidate data in a process of obtaining a target data filtering model through training. The second candidate dataset is used for continuously collecting newly generated second candidate data in a process of obtaining a target training data filtering model through training. In exemplary embodiments, initial values of both the first candidate dataset and the second candidate dataset are empty sets.

In one implementation, a process of updating the parameter of the first data filtering model based on the candidate data of the target amount to obtain the updated first data filtering model includes the following steps I to III.

In Step I, a target function corresponding to the first data filtering model is updated based on the candidate data of the target amount.

In one implementation, a form of the target function is $Q^\pi(s,a)$, and a method for updating the target function corresponding to the first data filtering model includes updating the target function corresponding to the first data filtering model based on a Bellman equation (formula 2).

$$Q^\pi(s,a)=E[R_i|s_i=s,a_i=a,\pi] \quad \text{(Formula 2)}$$

where $$R_i = \sum_{t=i}^{T} \gamma^{t-i} r_t, \gamma \in [0, 1], R_i$$

is a long-term weight after discount, and γ is a discount factor.

In Step II, a loss function corresponding to the first data filtering model is calculated based on an updated target function.

The current loss function may be calculated based on the updated target function after the updated target function is obtained. In one implementation, the loss function is calculated based on the following formula 3:

$$L(\theta) = E_{s,a,r,s'}\left[(y_i(r, s') - Q(s, a; \theta))^2\right] \quad \text{(Formula 3)}$$

where L(θ) represents the loss function, and $y_i(r,s')=r+\gamma \max_{a'} Q(s',a';\theta_{i-1})$ is a target function value obtained based on a current parameter $\theta_{i-1}$ of the first data filtering model.

In Step III, the parameter of the first data filtering model is updated based on the loss function to obtain the updated first data filtering model.

After the loss function is obtained, the parameter of the first data filtering model is updated based on a target of minimizing the loss function, to obtain the updated first data filtering model.

In one implementation, the loss function L(θ) is minimized by using a stochastic gradient descent (SGD) algorithm.

Figure 6:
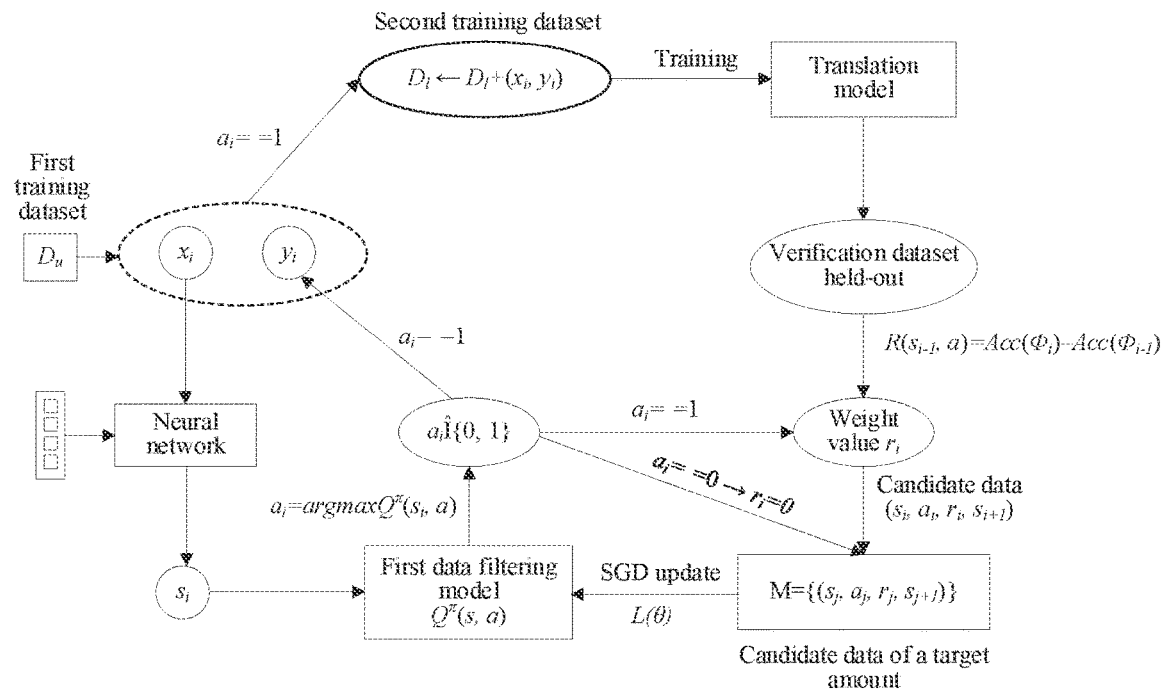
FIG. 6 is a schematic diagram of a process of acquiring an updated first data filtering model according to an embodiment of this disclosure.

In conclusion, a process of acquiring the updated first data filtering model is shown in FIG. 6. Target features of all source language training data $s_i$ are acquired based on all source language training data $x_i$ in any target training dataset in a first training dataset $D_u$ and a neural network; and $s_i$ is input to the first data filtering model, and the first data filtering model determines filtering results of all the source language training data based on a formula $a_i$=argmax $Q^\pi(s_i, a)$. When the filtering results are 0, 0 is used as a weight value $r_i$. When the filtering results are 1, markup language data $y_i$ is acquired. $(x_i, y_i)$ is added to a second training dataset $D_l$, and the first translation model is trained by using the second training dataset $D_l$ to obtain the second translation model. The model performance of the first translation model and the second translation model is calculated by using a held-out verification dataset, and a difference between the model performance is used as a weight value of source language training data whose filtering result is 1. Candidate data $(s_i, a_i, r_i, s_{i+1})$ is generated. Candidate data of a target amount is selected, and the loss function L(θ) is minimized by using an SGD algorithm to obtain the updated first data filtering model.

In Step 3026, the updated first data filtering model is trained based on the second target training dataset, and the operations are repeated until a second training termination condition is met to obtain the second data filtering model.

A process of training the updated first data filtering model based on the second target training dataset includes performing step 3022 to step 3025 based on the second target training dataset and the updated first data filtering model to obtain a further updated first data filtering model. The operations may be repeated until the second training termination condition is met.

In one implementation, whether the second training termination condition is met is determined once each time the first data filtering model is updated. If the second training termination condition is not met, step 3022 to step 3025 are performed based on a next target training dataset and a currently latest first data filtering model to continue updating the first data filtering model; or if the second training termination condition is met, iterative training stops, and an updated first data filtering model obtained at this moment is used as the second data filtering model.

In one implementation, that the second training termination condition is met includes but is not limited to the following two cases.

Case 1: No target training dataset meeting a condition exists in the first training dataset, and target features of all source language training data in a target training dataset meeting the condition have not been filtered.

When no target training dataset meeting the condition exists in the first training dataset, it indicates that all source language training data in the first training dataset has been used as training data to participate in the training process of acquiring the second data filtering model. In this case, it is considered that the second training termination condition is met.

Case 2: An amount of source language training data whose filtering results are first results reaches an amount threshold.

For example, the amount threshold is set based on training budget. When an amount of source language training data whose filtering results are first results reaches the amount threshold, it indicates that sufficient source language training data has been obtained through filtering. In this case, it is considered that the second training termination condition is met.

It is considered that the second training termination condition is met when either of the foregoing two cases is met, and the second data filtering model is obtained.

In Step 303, the first training dataset is reinitialized in response to that a first training termination condition is not met, and the second data filtering model is trained based on the reinitialized first training dataset by using the reinforcement learning algorithm to obtain a third data filtering model; and the operations are repeated until the first training termination condition is met to obtain the target data filtering model.

The target data filtering model is further acquired based on the second data filtering model after the second data filtering model is obtained according to step 3026.

In one implementation, a method for acquiring the target data filtering model based on the second data filtering model includes using the second data filtering model as the target data filtering model in response to that the first training termination condition is met; reinitializing the first training dataset in response to that the first training termination condition is not met, and training the second data filtering model based on the reinitialized first training dataset by using the reinforcement learning algorithm to obtain the third data filtering model; and repeating the operations until the first training termination condition is met, and using a data filtering model obtained when the first training termination condition is met as the target data filtering model. In other words, steps 301 and 302 are performed again when the first training termination condition is not met, to obtain the third data filtering model corresponding to the reinitialized first training dataset. The foregoing process is repeated.

In one implementation, whether the first training termination condition is met is determined once each time a data filtering model is obtained. Steps 301 and 302 continue to be performed if the first training termination condition is not met, to continue acquiring a data filtering model. Iterative training stops if the first training termination condition is met, and a data filtering model obtained at this moment is used as the target data filtering model. In one implementation, that the first training termination condition is met means that a quantity of times for which the first training dataset is initialized reaches a quantity threshold.

In conclusion, in one implementation, a process of acquiring the target data filtering model is viewed as a process of acquiring a policy n. An algorithm procedure of acquiring the policy π is as follows:

Input: data $D_u$, budget B, NMT model φ//Input: first training dataset $D_u$, budget B, translation model φ
Output: π//Output: π
1: for episode=1, 2, . . . , N do//Perform the following step in each episode
2: $D_l \leftarrow \emptyset$ and shuffle $D_u$//The second training dataset $D_l$ is an empty set, and the first training dataset $D_u$ is randomly shuffled
3: φ←Init NMT//Initialize the translation model φ
4: for mini-batch $(x_1, x_2, \ldots x_k)$ sample from $D_u$//Perform the following step for each target training dataset $(x_1, x_2, \ldots x_k)$ in the first training dataset $D_u$
5: Construct the state $(s_1, s_2, \ldots s_k)$ using $(x_1, x_2, \ldots x_k)$//Construct the target feature $(s_1, s_2, \ldots s_k)$ of the target training dataset $(x_1, x_2, \ldots x_k)$
6: The agent makes a decision according to//The agent (the data filtering model in this disclosure) outputs a filtering result based on a formula $a_i = \text{argmax } Q^\pi(s_i, a)$ $a_i = \text{argmax } Q^\pi(s_i, a), i \in (l, \ldots k)$ 7: for i in k do://Perform the following operation for each piece of source language training data
8: if $a_i=1$ then//If the filtering result is 1, then
9: Obtain the annotation $y_i$//Obtain the markup language data $y_i$,
10: $D_l \leftarrow D_l + (x_i, y_i)$//Add $(x_i, y_i)$ to the second training dataset $D_l$
11: end if
12: end for
13: Update model φ based on $D_l$//Update the translation model φ based on the second training dataset $D_l$
14: Receive a reward $r_i$ using held-out set//Acquire a reward (the first weight value in this disclosure) $r_i$ using a verification dataset
15: if $|D_l|=B$ then//If the second training dataset meets the budget B, then
16: Store $(s_i, a_i, r_i, \text{Terminate})$ in M//Store $(s_i, a_i, r_i, \text{terminate})$ in a candidate dataset M
17: Break
18: end if
19: Construct the new state $(s_{k+1}, s_{k+2}, \ldots s_{2k})$//Construct the new target feature $(s_{k+1}, s_{k+2}, \ldots s_{2k})$
20: Store transition $(s_i, a_i, r_i, s_{i+1})$ in M//Store $(s_i, a_i, r_i, s_{i+1})$ in the candidate dataset M
21: Sample random minibatch of transitions $\{(s_j, a_j, r_j, s_{j+1})\}$ from M,
and perform gradient descent step on $L(\theta)$//Randomly select the candidate data $\{(s_j, a_j, r_j, s_{j+1})\}$ of the target amount from M, and perform gradient descent on the loss function $L(\theta)$
22: Update policy π with θ///Update π with θ
23: end for
24: end for
25: return the latest policy π//Return the latest π

Figure 7:
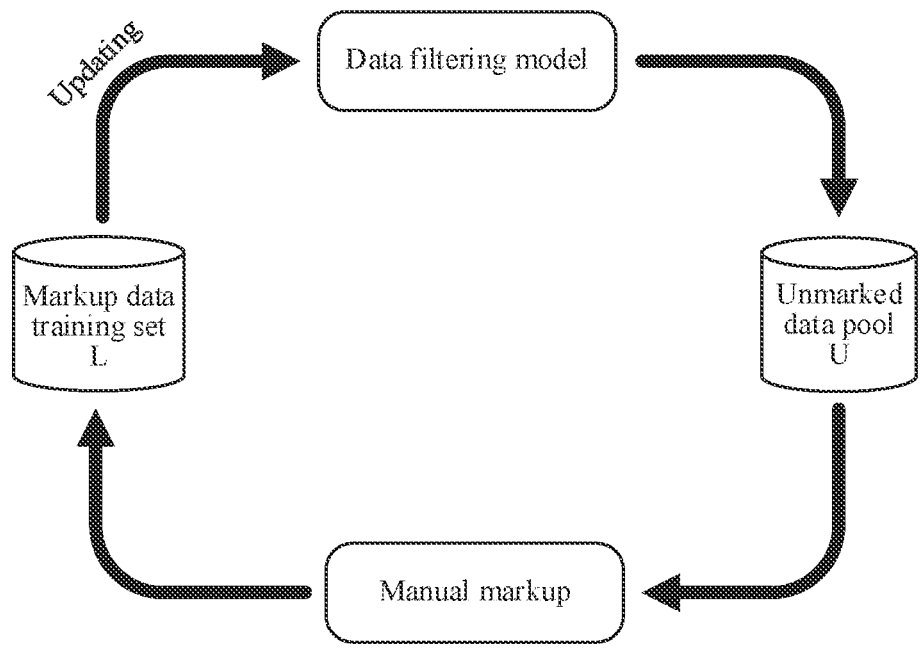
FIG. 7 is a schematic diagram of an active learning process according to an embodiment of this disclosure.

In an actual application scenario, a data filtering model can be applicable to an active learning process. Active learning is a simple technology for marking up data. In active learning, first, some instances are selected from a dataset that is not marked up; and then, the instances are manually marked up. The process is repeated a plurality of times until a termination condition is met. As shown in FIG. 7, a data filtering model is updated based on a markup data training set L, some to-be-marked data is manually marked up by a professional in an unmarked data pool U based on the data filtering model, and then, the markup data is added to the markup data training set L. The process is repeated until a termination condition is met. For example, the termination condition is that data an amount of data in the markup data training set L reaches a threshold.

In this embodiment of this disclosure, a target data filtering model is obtained through training performed by using a reinforcement learning algorithm. A filtering rule in the target data filtering model is automatically learned by a machine in a reinforcement learning process. The target data filtering model has a wide range of application scenarios, so that quality of source language data remaining after filtering performed based on the target data filtering model is relatively high, which further facilitates improvement of translation performance of a machine translation model acquired based on the source language data remaining after the filtering and markup language data corresponding to the source language data remaining after the filtering.

Figure 8:
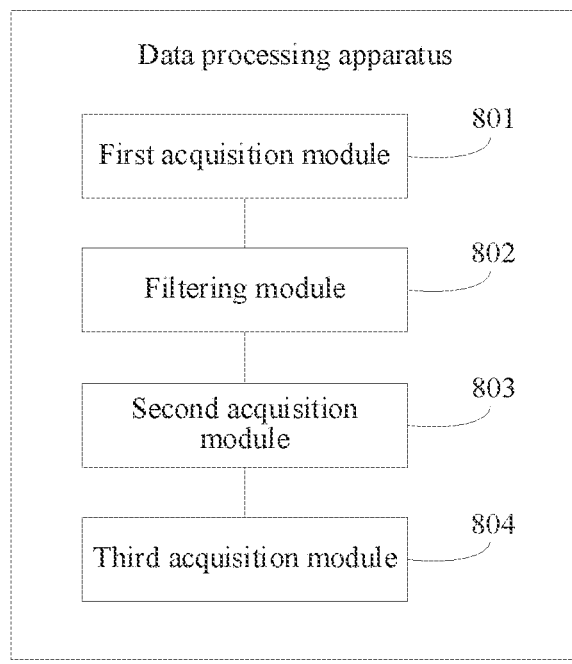
FIG. 8 is a schematic diagram of a data processing apparatus according to an embodiment of this disclosure.

Referring to FIG. 8, an embodiment of this disclosure provides a data processing apparatus. The apparatus includes a first acquisition module 801, a filtering module 802, a second acquisition module 803, and a third acquisition module 804. One or more modules of the apparatus can be implemented by processing circuitry, software, or a combination thereof, for example.

The first acquisition module 801 is configured to acquire a to-be-filtered dataset, the to-be-filtered dataset including a plurality of pieces of to-be-filtered source language data.

The filtering module 802 is configured to filter all source language data in the to-be-filtered dataset based on a target data filtering model to obtain target source language data remaining after the filtering, the target data filtering model being obtained through training performed by using a reinforcement learning algorithm.

The second acquisition module 803 is configured to acquire markup language data corresponding to the target source language data.

The third acquisition module 804 is configured to acquire a machine translation model based on the target source language data and the markup language data.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 9:
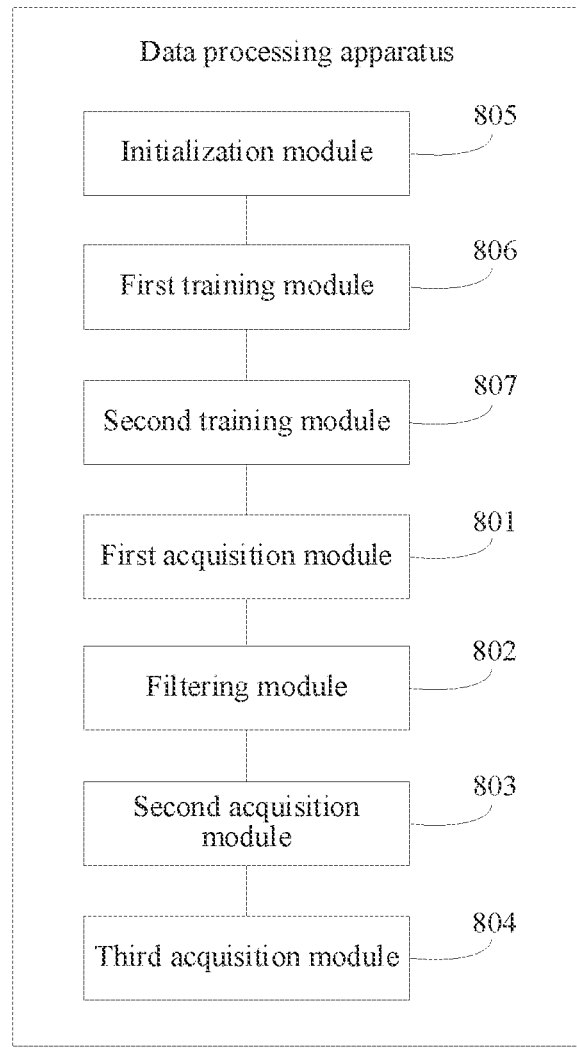
FIG. 9 is a schematic diagram of a data processing apparatus according to an embodiment of this disclosure.

In one implementation, referring to FIG. 9, the apparatus further includes an initialization module 805, a first training module 806, a second training module 807, the first acquisition module 801, the filtering module 802, the second acquisition module 803, and the third acquisition module 804.

The initialization module 805 is configured to initialize a first training dataset, the first training dataset including a plurality of pieces of source language training data.

The first training module 806 is configured to train a first data filtering model based on the initialized first training dataset by using the reinforcement learning algorithm to obtain a second data filtering model.

The second training module 807 is configured to: reinitialize the first training dataset in response to that a first training termination condition is not met, and train the second data filtering model based on the reinitialized first training dataset by using the reinforcement learning algorithm to obtain a third data filtering model; and repeat the operations until the first training termination condition is met to obtain the target data filtering model.

Figure 10:
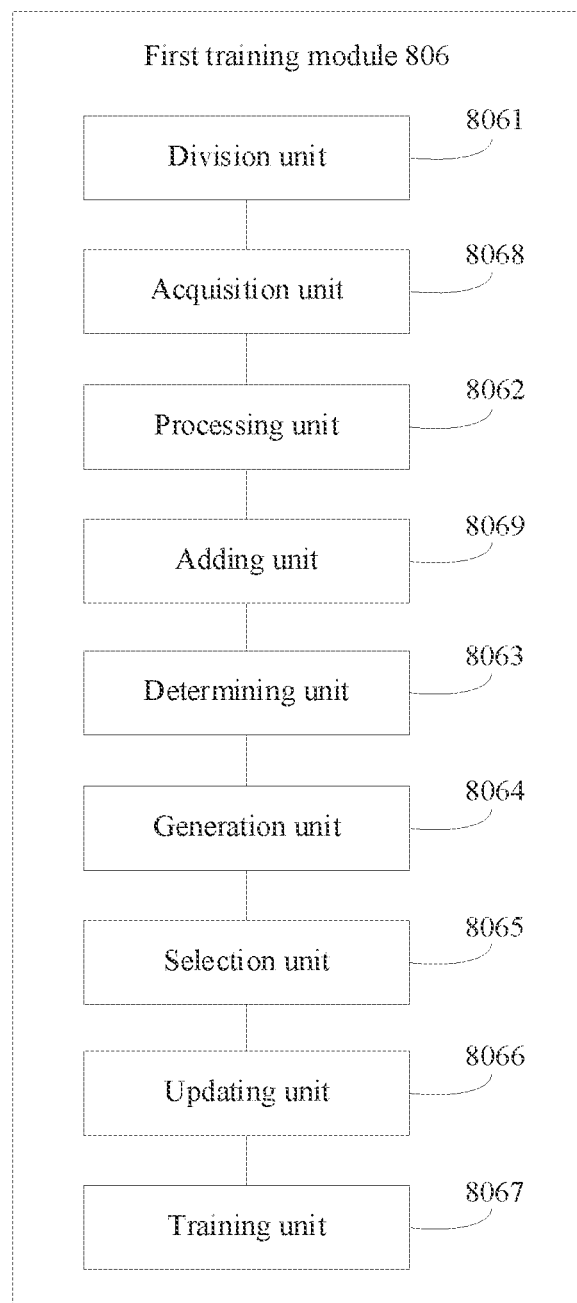
FIG. 10 is a schematic structural diagram of a first training module according to an embodiment of this disclosure.

In one implementation, referring to FIG. 10, the first training module 806 includes a division unit 8061, a processing unit 8062, a determining unit 8063, a generation unit 8064, a selection unit 8065, an updating unit 8066, and a training unit 8067. One or more units of the first training module 806 can be implemented by processing circuitry, software, or a combination thereof, for example.

The division unit 8061 is configured to divide the initialized first training dataset into at least one target training dataset.

The processing unit 8062 is configured to invoke a first data filtering model to filter target features of all source language training data in a first target training dataset to obtain filtering results of all the source language training data in the first target training dataset, the first target training dataset being the first target training dataset in the at least one target training dataset.

The determining unit 8063 is configured to determine a weight value of any source language training data in the first target training dataset based on a filtering result of the source language training data.

The generation unit 8064 is configured to generate candidate data corresponding to the source language training data based on a target feature of the source language training data, the filtering result of the source language training data, the weight value of the source language training data, and a target feature of reference source language training data, the reference source language training data being source language data, in a second target training dataset, corresponding to the source language training data, and the second target training dataset being a next target training dataset of the first target training dataset in the at least one target training dataset.

The selection unit 8065 is configured to select candidate data of a target amount based on candidate data corresponding to all the source language training data in the first target training dataset.

The updating unit 8066 is configured to update a parameter of the first data filtering model based on the candidate data of the target amount to obtain an updated first data filtering model.

The training unit 8067 is configured to: train the updated first data filtering model based on the second target training dataset, and repeat the operations until a second training termination condition is met to obtain the second data filtering model.

In one implementation, the determining unit 8063 is configured to use a first weight value as the weight value of the source language training data in response to that the filtering result of the source language training data is a first result, and use a second weight value as the weight value of the source language training data in response to that the filtering result of the source language training data is a second result.

In one implementation, referring to FIG. 10, the first training module 806 further includes an acquisition unit 8068 configured to acquire markup language training data corresponding to all target source language training data in the first target training dataset, filtering results of all the target source language training data being first results.

Referring to FIG. 10, the first training module 806 further includes an adding unit 8069 configured to add, as training data to a second training dataset, all the target source language training data and the markup language training data corresponding to all the target source language training data.

The training unit 8067 is further configured to train a first translation model based on the second training dataset to obtain a second translation model.

The acquisition unit 8068 is further configured to acquire the first weight value based on the second translation model and the first translation model.

In one implementation, the acquisition unit 8068 is further configured to: acquire a first feature of any source language training data in the first target training dataset based on all subdata in the source language training data, acquire a second feature of the source language training data based on the source language training data and a third translation model, and acquire a target feature of the source language training data based on the first feature and the second feature.

In one implementation, the acquisition unit 8068 is further configured to: acquire a third feature of the source language training data based on word embedding features of all the subdata in the source language training data acquire a fourth feature of the source language training data based on comparison results between all the subdata in the source language training data and a corpus database; determine a length of the source language training data based on an amount of all the subdata in the source language training data, acquire a fifth feature of the source language training data based on the length of the source language training data; and acquire the first feature of the source language training data based on the third feature, the fourth feature, and the fifth feature.

In one implementation, the acquisition unit 8068 is further configured to: acquire translation data of the source language training data based on the third translation model, and acquire a sixth feature of the source language training data based on a word embedding feature of the translation data; acquire target translation subdata corresponding to all the subdata in the source language training data based on the third translation model, and acquire a seventh feature of the source language training data based on word embedding features of the target translation subdata corresponding to all the subdata, a translation probability of target translation subdata corresponding to any subdata being the largest among translation probabilities of all candidate translation subdata corresponding to the subdata; acquire translation probabilities of the target translation subdata corresponding to all the subdata, and acquire an eighth feature of the source language training data based on the translation probabilities of the target translation subdata corresponding to all the subdata and a length of the translation data; and acquire the second feature of the source language training data based on the sixth feature, the seventh feature, and the eighth feature.

In one implementation, the generation unit 8064 is configured to: (1) generate first candidate data corresponding to the source language training data based on the target feature of the source language training data, the first result, the first weight value, and the target feature of the reference source language training data in response to that the filtering result of the source language training data is the first result; and (2) generate second candidate data corresponding to the source language training data based on the target feature of the source language training data, the second result, the second weight value, and the target feature of the reference source language training data in response to that the filtering result of the source language training data is the second result.

In one implementation, the adding unit 8069 is further configured to add the first candidate data in the candidate data corresponding to all the source language training data in the first target training dataset to a first candidate dataset, and add the second candidate data in the candidate data corresponding to all the source language training data in the first target training dataset to a second candidate dataset.

The selection unit 8065 is further configured to perform equal ratio selection in the first candidate dataset and the second candidate dataset to obtain the candidate data of the target amount.

In one implementation, the updating unit 8066, is configured to update a target function corresponding to the first data filtering model based on the candidate data of the target amount, calculate a loss function corresponding to the first data filtering model based on an updated target function, and update a parameter of the first data filtering model based on the loss function to obtain an updated first data filtering model.

In one implementation, that the second training termination condition is met includes no target training dataset meeting a condition exists in the first training dataset, and target features of all source language training data in a target training dataset meeting the condition have not been filtered; or an amount of source language training data whose filtering results are first results reaches an amount threshold.

In this embodiment of this disclosure, all source language data in a to-be-filtered dataset is filtered based on a target data filtering model obtained through training performed by using a reinforcement learning algorithm. Further, a machine translation model is acquired based on target source language data remaining after the filtering and markup language data corresponding to the target source language data. In such a data processing process, a filtering rule in the target data filtering model is automatically learned by a machine in a reinforcement learning process. The target data filtering model has a wide range of application scenarios, and quality of source language data remaining after the filtering is relatively high, so that translation performance of the machine translation model acquired based on the source language data remaining after the filtering and markup language data corresponding to the source language data remaining after the filtering is better.

When the apparatus provided in the foregoing embodiments implements functions of the apparatus, the division of the foregoing functional modules is merely an example for description. In the practical application, the functions may be assigned to and completed by different functional modules according to the requirements, that is, the internal structure of the device is divided into different functional modules, to implement all or some of the functions described above. In addition, the apparatus and method embodiments provided in the foregoing embodiments belong to the same concept. For the specific implementation process, reference may be made to the method embodiments, and details are not described herein again.

Figure 11:
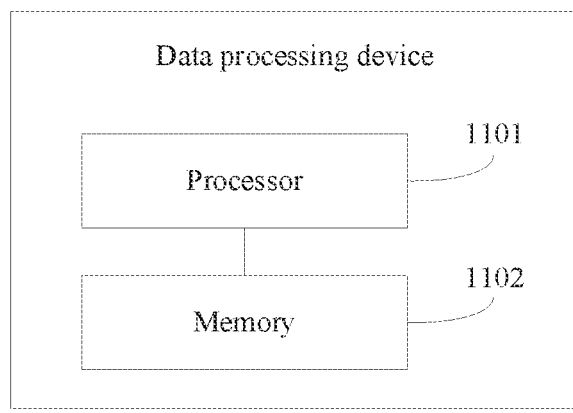
FIG. 11 is a schematic structural diagram of a data processing device according to an embodiment of this disclosure.

FIG. 11 is a schematic structural diagram of a data processing device according to an embodiment of this application. For example, the data processing device is a server. The server may vary greatly due to different configurations or performance. The server includes one or more processors (which may be central processing units (CPU), which are examples of processing circuitry) 1101 and one or more memories 1102. The one or more memories 1102 store at least one program code, and the at least one program code is loaded and executed by the one or more processors 1101 to implement the data processing methods provided in the foregoing method embodiments. Certainly, the server can further have components such as a wired or wireless network interface, a keyboard, and an input/output interface to facilitate an input and an output. The server can further include a component configured to implement a function of the device, and details are not described herein.

In exemplary embodiments, a computer device is further provided. The computer device includes one or more processors (processing circuitry) and a memory. The memory stores at least one program code. The at least one program code is loaded and executed by one or more processors (processing circuitry) to implement the data processing method according to the first aspect.

In exemplary embodiments, a non-transitory computer readable storage medium is further provided, storing at least one program code, and the at least one program code being loaded and executed by a processor (processing circuitry) of a computer device to implement the data processing method according to the first aspect.

The non-transitory computer readable storage medium can be a read-only memory (ROM), a random access memory (RAM), a compact disc read-only memory (CD-ROM), a tape, a floppy disk, an optical data storage device, or the like.

In exemplary embodiments, a computer program product is further provided, storing at least one computer program, and the at least one computer program being loaded and executed by a processor of a computer device to implement the data processing method according to the first aspect.

A "plurality" of mentioned in the specification means two or more. The "and/or" describes an association relationship for describing associated objects and represents that three relationships exist. For example, A and/or B represent(s) the following three cases: Only A exists, both A and B exist, and only B exists. The character "/" generally indicates an "or" relationship between the associated objects.

The foregoing descriptions are merely examples of the embodiments of this disclosure, but are not intended to limit this disclosure. Any modification, equivalent replacement, or improvement made without departing from the spirit and principle of this disclosure shall fall within the protection scope of this disclosure.

The invention claimed is:

1. A data processing method, comprising:
   acquiring a to-be-filtered dataset, the to-be-filtered dataset comprising a plurality of pieces of to-be-filtered source language data;
   filtering, by processing circuitry, the plurality of pieces of the to-be-filtered source language data in the to-be-filtered dataset based on a target data filtering model to obtain target source language data remaining after the filtering, the target data filtering model being obtained through training performed by using a reinforcement learning algorithm, wherein the target data filtering model is trained based on a plurality of pieces of candidate data, each piece of the candidate data respectively corresponding to a piece of source language training data in a first target training dataset, the each piece of the candidate data being generated based on
(i) a target feature, a filtering result, and a weight value of the each piece of the source language training data in the first target training dataset, and
(ii) a target feature of a piece of reference source language training data in a second target training dataset, wherein the reference source language training data corresponds to the each piece of the source language training data in the first target training dataset, and the second target training dataset is a next target training dataset of the first target training dataset in a plurality of target training datasets;

acquiring markup language data corresponding to the obtained target source language data; and acquiring a machine translation model based on the obtained target source language data and the acquired markup language data.

2. The method according to claim 1, wherein before the filtering, the method further comprises:

initializing a first training dataset, the first training dataset comprising the plurality of pieces of the source language training data;

training a first data filtering model based on the initialized first training dataset by using the reinforcement learning algorithm to obtain a second data filtering model;

reinitializing the first training dataset when a first training termination condition is not met, and training the second data filtering model based on the reinitialized first training dataset by using the reinforcement learning algorithm to obtain a third data filtering model; and repeating the reinitializing and training the second data filtering model until the first training termination condition is met, to obtain the target data filtering model.

3. The method according to claim 2, wherein the training the first data filtering model further comprises:

dividing the initialized first training dataset into the plurality of target training datasets;

invoking the first data filtering model to filter the target feature of the each piece of the source language training data in the first target training dataset to obtain the filtering result for each piece of the source language training data in the first target training dataset, the first target training dataset being the first target training dataset in the plurality of the target training datasets;

determining the weight value for each piece of the source language training data in the first target training dataset, based on the filtering result of the respective piece of the source language training data; and selecting a target amount of the candidate data based on the plurality of the candidate data corresponding to the pieces of the source language training data in the first target training dataset, and updating a parameter of the first data filtering model based on the selected target amount of the candidate data to obtain an updated first data filtering model; and training the updated first data filtering model based on the second target training dataset, and repeating operations until a second training termination condition is met to obtain the second data filtering model.

4. The method according to claim 3, wherein the determining comprises:

using a first weight value as the weight value of the piece of the source language training data when the filtering result of the piece of the source language training data is a first result; and using a second weight value as the weight value of the piece of the source language training data when the filtering result of the piece of the source language training data is a second result.

5. The method according to claim 4, wherein before the using the first weight value as the weight value of the piece of the source language training data, the method further comprises:

acquiring each piece of markup language training data corresponding to each piece of target source language training data in the first target training dataset, a filtering result of the each piece of the target source language training data being the first result;

adding, as training data to a second training dataset, the each piece of the target source language training data and the each piece of the markup language training data corresponding to the each piece of the target source language training data;

training a first translation model based on the second training dataset to obtain a second translation model; and acquiring the first weight value based on the second translation model and the first translation model.

6. The method according to claim 3, wherein before the invoking, the method further comprises:

acquiring a first feature from one of the pieces of the source language training data in the first target training dataset, based on each piece of subdata in the one of the pieces of the source language training data;

acquiring a second feature of the one of the pieces of the source language training data based on the one of the pieces of the source language training data and a third translation model; and acquiring the target feature of the one of the pieces of the source language training data based on the acquired first feature and the acquired second feature.

7. The method according to claim 6, wherein the acquiring the first feature further comprises:

acquiring a third feature of the one of the pieces of the source language training data based on word-embedding features of the each piece of the subdata in the one of the pieces of the source language training data;

acquiring a fourth feature of the one of the pieces of the source language training data based on comparison results between the each piece of the subdata in the one of the pieces of the source language training data and a corpus database;

determining a length of the one of the pieces of the source language training data based on the each piece of the subdata in the one of the pieces of the source language training data, and acquiring a fifth feature of the one of the pieces of the source language training data based on the determined length of the one of the pieces of the source language training data; and acquiring the first feature of the one of the pieces of the source language training data based on the acquired third feature, the acquired fourth feature, and the acquired fifth feature.

8. The method according to claim 6, wherein the acquiring the second feature further comprises:

acquiring translation data of the one of the pieces of the source language training data based on the third translation model, and acquiring a sixth feature of the one of the pieces of the source language training data based on a word-embedding feature of the translation data;

acquiring, based on the third translation model, target translation subdata with a largest probability corresponding to the each piece of the subdata in the one of the pieces of the source language training data, and acquiring a seventh feature of the one of the pieces of the source language training data based on word-embedding features of the acquired largest probability target translation subdata;

acquiring translation probabilities of the target translation subdata corresponding to the each piece of the subdata, and acquiring an eighth feature of the one of the pieces of the source language training data based on the translation probabilities of the target translation subdata corresponding to the each piece of the subdata and a length of the translation data; and acquiring the second feature of the one of the pieces of the source language training data based on the acquired sixth feature, the acquired seventh feature, and the acquired eighth feature.

9. The method according to claim 1, wherein the generating comprises:

generating first candidate data corresponding to the one of the pieces of the source language training data based on the target feature of the one of the pieces of the source language training data, the first result, the first weight value, and the target feature of the one of the pieces of the reference source language training data when the filtering result of the source language training data is the first result; and generating second candidate data corresponding to the one of the pieces of the source language training data based on the target feature of the one of the pieces of the source language training data, the second result, the second weight value, and the target feature of the one of the pieces of the reference source language training data when the filtering result of the source language training data is the second result.

10. The method according to claim 3, wherein the selecting further comprises:

adding the first candidate data in the candidate data corresponding to the one of the pieces of the source language training data in the first target training dataset to a first candidate dataset, and adding the second candidate data in the candidate data corresponding to the one of the pieces of the source language training data in the first target training dataset to a second candidate dataset; and performing equal ratio selection in the first candidate dataset and the second candidate dataset to obtain the target amount of the candidate data.

11. The method according to claim 3, wherein the updating the parameter of the first data filtering model further comprises:

updating a target function corresponding to the first data filtering model based on the candidate data of the target amount;

calculating a loss function corresponding to the first data filtering model based on an updated target function; and updating the parameter of the first data filtering model based on the loss function to obtain the updated first data filtering model.

12. The method according to claim 3, wherein the second training termination condition comprises:

no target training dataset meeting a condition exists in the first training dataset, and the target features of the source language training data in a target training dataset meeting the condition have not been filtered; or an amount of the source language training data whose filtering results are first results reaches an amount threshold.

13. A computer device, comprising processing circuitry and a memory, the memory storing at least one program code, and the at least one program code being loaded and executed by the processing circuitry to implement the data processing method according to claim 1.

14. A non-transitory computer readable storage medium, storing instructions which when executed by a processor cause the processor to perform:

acquiring a to-be-filtered dataset, the to-be-filtered dataset comprising a plurality of pieces of to-be-filtered source language data;

filtering the plurality of pieces of the to-be-filtered source language data in the to-be-filtered dataset based on a target data filtering model to obtain target source language data remaining after the filtering, the target data filtering model being obtained through training performed by using a reinforcement learning algorithm, wherein the target data filtering model is trained based on a plurality of pieces of candidate data, each piece of the candidate data respectively corresponding to a piece of source language training data in a first target training dataset, the each piece of the candidate data being generated based on
(i) a target feature, a filtering result, and a weight value of the each piece of the source language training data in the first target training dataset, and
(ii) a target feature of a piece of reference source language training data in a second target training dataset, wherein the reference source language training data corresponds to the each piece of the source language training data in the first target training dataset, and the second target training dataset is a next target training dataset of the first target training dataset in a plurality of target training datasets;

acquiring markup language data corresponding to the obtained target source language data; and acquiring a machine translation model based on the obtained target source language data and the acquired markup language data.

15. A data processing apparatus, comprising:

processing circuitry configured to acquire a to-be-filtered dataset, the to-be-filtered dataset including a plurality of pieces of to-be-filtered source language data;

filter the plurality of pieces of the to-be-filtered source language data in the to-be-filtered dataset based on a target data filtering model to obtain target source language data remaining after the filtering, the target data filtering model being obtained through training performed by using a reinforcement learning algorithm, wherein the target data filtering model is trained based on a plurality of pieces of candidate data, each piece of the candidate data respectively corresponding to a piece of source language training data in a first target training dataset, the each piece of the candidate data being generated based on
(i) a target feature, a filtering result, and a weight value of the each piece of the source language training data in the first target training dataset, and
(ii) a target feature of a piece of reference source language training data in a second target training dataset, wherein the reference source language training data corresponds to the each piece of the source language training data in the first target training dataset, and the second target training dataset is a next target training dataset of the first target training dataset in a plurality of target training datasets;

acquire markup language data corresponding to the obtained target source language data; and acquire a machine translation model based on the obtained target source language data and the acquired markup language data.

16. The data processing apparatus of claim 15, wherein the processing circuitry is further configured to, before the filtering:

initialize a first training dataset, the first training dataset comprising the plurality of pieces of the source language training data;

train a first data filtering model based on the initialized first training dataset by using the reinforcement learning algorithm to obtain a second data filtering model;

reinitialize the first training dataset when a first training termination condition is not met, and training the second data filtering model based on the reinitialized first training dataset by using the reinforcement learning algorithm to obtain a third data filtering model; and repeating the reinitializing and training the second data filtering model until the first training termination condition is met, to obtain the target data filtering model.

17. The data processing apparatus of claim 16, wherein, in training the first data filtering model, the processing circuitry is further configured to:

divide the initialized first training dataset into the plurality of target training datasets;

invoke the first data filtering model to filter the target feature of the each piece of the source language training data in the first target training dataset to obtain the filtering result for each piece of the source language training data in the first target training dataset, the first target training dataset being the first target training dataset in the plurality of the target training datasets;

determine the weight value for each piece of the source language training data in the first target training dataset, based on the filtering result of the respective piece of the source language training data; and select a target amount of the candidate data based on the plurality of the candidate data corresponding to the pieces of the source language training data in the first target training dataset, and update a parameter of the first data filtering model based on the selected target amount of the candidate data to obtain an updated first data filtering model; and train the updated first data filtering model based on the second target training dataset, and repeat operations until a second training termination condition is met to obtain the second data filtering model.

18. The data processing apparatus of claim 17, wherein the processing circuitry is further configured to:

use a first weight value as the weight value of the piece of the source language training data when the filtering result of the piece of the source language training data is a first result; and use a second weight value as the weight value of the piece of the source language training data when the filtering result of the piece of the source language training data is a second result.

19. The data processing apparatus of claim 18, wherein the processing circuitry is further configured to, before using the first weight value as the weight value of the piece of the source language training data:

acquire each piece of markup language training data corresponding to each piece of target source language training data in the first target training dataset, a filtering result of the each piece of the target source language training data being the first result;

add, as training data to a second training dataset, the each piece of the target source language training data and the each piece of the markup language training data corresponding to the each piece of the target source language training data;

train a first translation model based on the second training dataset to obtain a second translation model; and acquire the first weight value based on the second translation model and the first translation model.

20. The data processing apparatus of claim 17, wherein the processing circuitry is further configured to, before the invoking:

acquire a first feature from one of the pieces of the source language training data in the first target training dataset, based on each piece of subdata in the one of the pieces of the source language training data;

acquire a second feature of the one of the pieces of the source language training data based on the one of the pieces of the source language training data and a third translation model; and acquire the target feature of the one of the pieces of the source language training data based on the acquired first feature and the acquired second feature.

* * * * *